Patented Feb. 12, 1929.

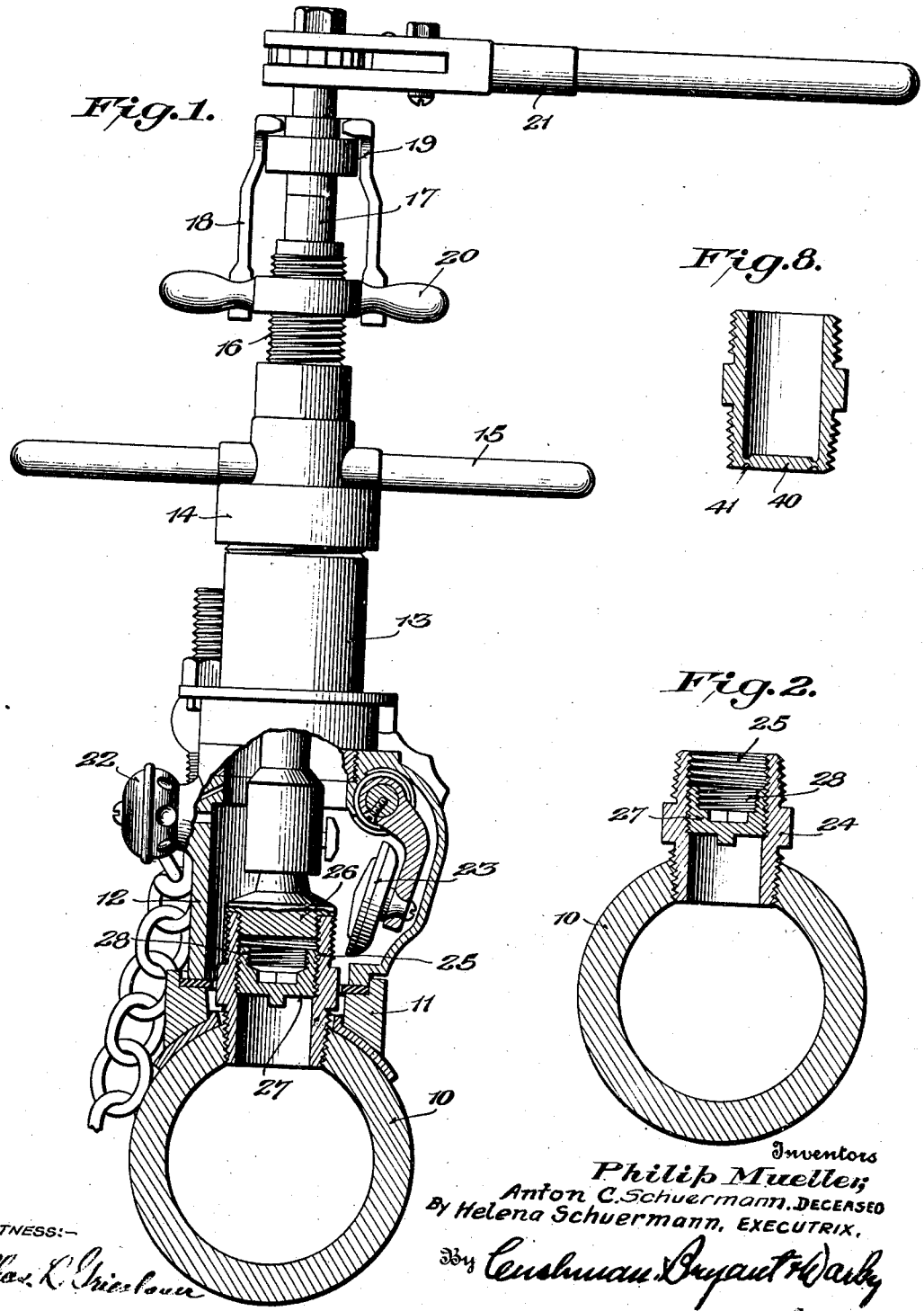

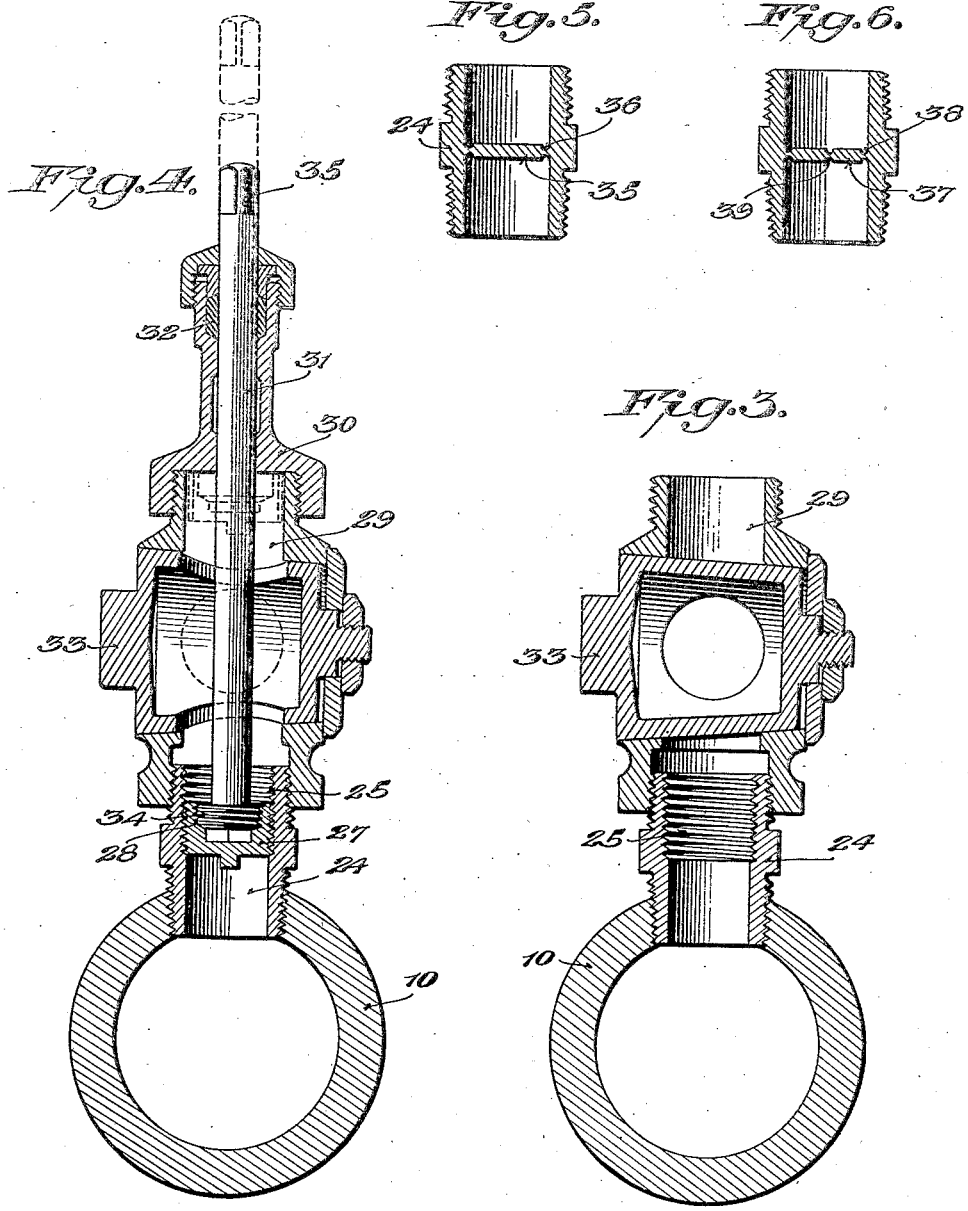

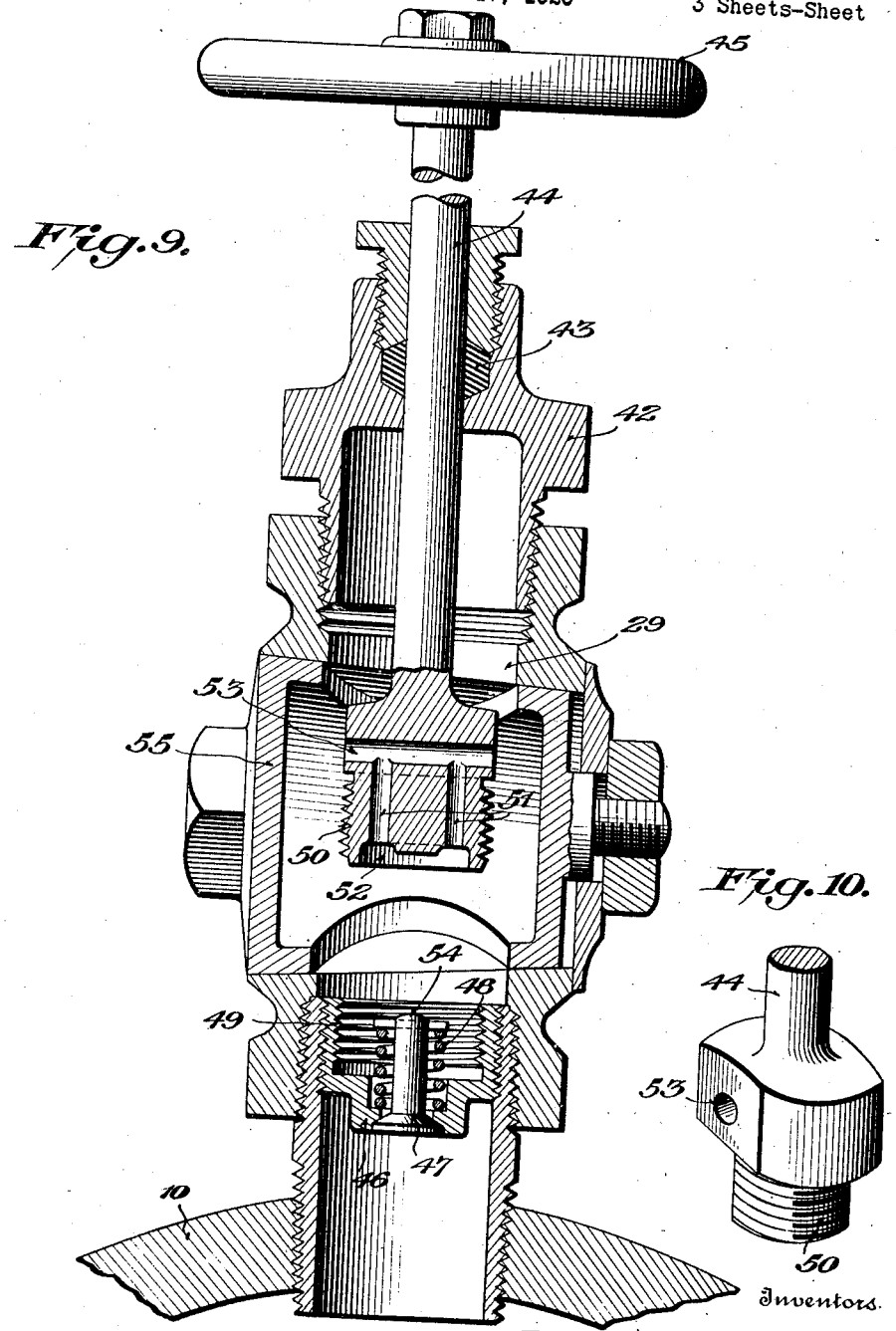

UNITED STATES PATENT OFFICE.

1,701,691

PHILIP MUELLER, OF DECATUR, AND ANTON C. SCHUERMANN, DECEASED, LATE OF DECATUR, ILLINOIS, BY HELENA SCHUERMANN, EXECUTRIX, OF DECATUR, ILLINOIS, ASSIGNORS TO ADOLPH MUELLER, TRUSTEE, OF DECATUR, ILLINOIS.

METHOD OF AND APPARATUS FOR INSERTING CORPORATION COCKS.

Application filed October 17, 1925. Serial No. 63,184.

The present invention relates to an apparatus for and a method of inserting corporation cocks in pipes and has to do as well with the construction of nipples utilized in practising the method and in using the apparatus.

The object of the invention is to provide means whereby corporation cocks of larger sizes than can now be attached by the devices and methods at present in use, may, following our method and utilizing our apparatus, be attached readily to mains or pipes.

The present method of attaching corporation cocks to pipes, is to attach to the pipe to be tapped, a tapping machine such as, for example, the well known Mueller tapping machine illustrated in Patent No. 1,280,813, dated October 8, 1918, which tapping machine comprises a pipe-engaging saddle, a chambered body provided with by-pass and waste valve, a flop valve, a boring bar cylinder, a boring bar traversing that cylinder and carrying suitable feeding devices to advance the boring bar and drill, and operating means for the boring bar, usually a ratchet handle. Such tapping machines are clamped in any suitable manner to the pipe so as to give a water tight joint between the saddle and the pipe, suitable gaskets being provided between saddle and pipe to form a water tight joint, and means for clamping the tapping machine to the pipe being provided.

The tapping operation is well known, and after the tap has been made and pressure from the main or pipe is admitted to the body of the tapping machine, the boring bar will be retracted, the flop valve closed and pressure from the main will stand in the body portion below the flop valve, permitting the removal of the boring bar with its attached drill. The boring bar will then have attached to it the corporation cock which is to be inserted in the tapped opening in the main, and such bar with the cock will be reset in the machine, with the cylinder cap and feed mechanisms properly attached, to again close the machine, after which the bar with the corporation cock having its key turned to closed position, will be fed down through the machine to insert the cock in the tapped main. Thereupon the tapping machine may be removed and the closed corporation cock is left set in the tapped main.

The Mueller tapping machine now in use and the method above described are efficient, but the difficulty which now exists is, that machines of different sizes must be provided for different sizes of corporation cocks owing to the fact that it is not feasible to provide a single machine for tapping and inserting cocks under the old method which will handle corporation cocks from say three-eighths of an inch up, to and including, say a two (2) inch cock, where the main must be tapped under pressure and, as stated, it is customary to provide machines of various sizes for tapping mains and inserting corporation cocks of different sizes.

With the smaller sized machine while it is possible to tap an opening of sufficient size, such machines, owing to the restricted area of the chambered body and the cylinder, will not take a large size corporation cock, and recourse must be had to a larger tapping machine where corporation cocks of the larger sizes are to be inserted.

This necessitates the provision of different sizes of tapping machines where the work involves inserting corporation cocks of various sizes.

Under the present method and utilizing the instrumentalities, which we shall describe in detail below, we are able, with a small tapping machine, to install a corporation cock of any size from the smallest to a size which could not, under the present methods, be inserted with such smaller tapping machine.

In order that the invention may be clear to those skilled in the art, we have illustrated in the drawings herewith various embodiments of our invention, and in said drawings:

Fig. 1 is a view in side elevation of a Mueller tapping machine, partly in section for clearness of illustration.

Fig. 2 is a view in section of a tapped pipe showing the first step and instrumentality used in practising our method.

Fig. 3 is a view in section of a pipe showing a corporation cock of large size attached thereto following our method.

Fig. 4 is a view in section illustrating a step of the method and apparatus for inserting corporation cocks.

Figs. 5, 6, 7 and 8 are views to illustrate forms of devices used in connection with our method.

Fig. 9 is a sectional view of a slightly different form of apparatus.

Fig. 10 is a detail of the apparatus shown in Fig. 9.

Referring to the drawings by numbers, like numbers indicating like parts in the several views, 10 indicates a pipe to be tapped, into which a corporation cock is to be inserted.

In Fig. 1 is shown, a tapping machine of the well known Mueller type, comprising a saddle 11, set upon a gasket on the pipe to be tapped. Rising from the saddle 11 is the body portion 12 of the tapping machine to which is secured the cylinder 13 having thereon the screw threaded cap 14 and its threaded feed screw 16. Traversing the cap, cylinder, and body portion, is the boring bar 17 which is engaged by a feed yoke 18 mounted upon the threaded screw 16 of the collar 14 and engaged at its upper end by the friction collar 19, said yoke having handles 20 by means of which it and the boring bar are fed downwardly during the tapping operation. The boring bar 17 will be provided with a suitable driving means at its upper end as, for example, the ratchet handle 21.

The body portion 12 will have the usual by-pass and waste 22 and the flop valve 23, all as is customary in this type of machine.

The tapping operation is an old and well known one and will not be described in detail.

The tapping machine, thus described, will be secured in place on the pipe by any of the usual means as, for example, a chain which is secured to proper fastening devices on the body of the tapping machine, passes around the pipe, and at its other end is secured to take up devices by means of which the tapping machine, with proper pressure to give a close contact of the saddle and gasket and give a fluid-tight joint, is seated upon the pipe.

The tapping operation having been completed, pressure in the main will, of course, stand in the tapping machine body and the cylinder. The operator will then close the flop valve 23, the boring bar with its drill having been drawn upwardly above the valve seat into the cylinder, the by-pass and waste valve 22 will be opened to drain the water from the cylinder 13 and this will confine the pressure in the body 12 of the tapping machine. The boring bar and associated parts will then be removed from the cylinder, the drill will be removed from the boring bar, and there will be attached to the boring bar or an equivalent bar, a nipple 24, which, as shown in Fig. 1, is screw threaded at its lower end and also at its upper end, being provided about midway of its length with a wrench or equivalent tool receiving surface. The said nipple 24 will be internally threaded at one end as shown, this interior thread 25 running in the same direction as to main-engaging thread, so that, for instance, a right hand rotation of the head 26, to be later described, will engage it with the nipple, and a right hand rotation of the nipple will engage the latter with the main.

As one convenient means of attaching the nipple 24 to the boring bar 17, there is provided a threaded and flanged head 26, the lower threaded end of which engages the interior threads of the nipple 24, with the flange resting upon the top of the nipple so as to limit inward movement of the threaded head 26. This head, with the nipple in threaded engagement therewith, is provided with a tail piece which engages a suitable socket on the lower end of the boring bar 17, so that the nipple, secured to the boring bar, may be fed downwardly and inserted in the tapped hole in the pipe 10 by the same instrumentalities, namely, the feed yoke 18 and the ratchet bar 21, that are utilized to drive the boring bar with the tapping drill. With the parts assembled as described, the boring bar will be inserted in the cylinder 13, the cap 14 will be threaded to the top thereof and the feed yoke and ratchet drive bar assembled as shown in Fig. 1. In this condition of the parts, the by-pass and waste valve 22 will be opened to admit pressure to the cylinder 13 and close the waste, and the flop valve will then be opened by means of the usual valve opening handle or hand wheel with which this flop valve is provided, and the boring bar with its nipple 24 then fed downwardly and the nipple inserted in the tapped hole in the pipe 10 until it is brought to the position in Fig. 1, securely seated in position in the pipe.

The nipple 24 has an internal closure which, as illustrated herein, may take various forms. In that form shown in Figs. 1 and 2, that internal closure 27 consists of a plug exteriorly threaded to engage the interior thread 25 on the inside of the nipple, and said plug 27 is provided on its upper side with tool-engaging means, by which a suitable tool may be engaged with the plug for the purpose of turning it in the nipple and removing it from the position shown in Figs. 1 and 2. In the present embodiment that tool-engaging means is shown as threaded bore 28, the threads of which will be cut reversely from the thread on the outside of the plug 27, so that, when a tool is driven into engagement with the thread 28, continued rotation of that tool will turn the closure or plug 27 and remove it from the nipple 24, leaving the nipple in the open condition shown in Fig. 3, in which condition the corporation cock 29 is shown threaded to the nipple 24 and ready for use. It will be observed that the plug 27 has a square or other suitably shaped recess centrally thereof to be engaged by a square wrench or other suitable tool to insert the plug in the nipple.

It is obvious that it would be impracticable to remove the closure 27 from the nipple in pipes under pressure prior to attaching the corporation cock, as pressure would immediately flow through the nipple, and, under high pressures, the corporation cock could not be secured to the nipple.

In order that this insertion of the nipple and removal of the closure may be accomplished in an expeditious and convenient manner, we have provided the apparatus shown in Fig. 4, in which the nipple 24 is shown inserted in the pipe with the corporation cock in place thereon and the closure or plug 27 in place. After the nipple 24 has been inserted in the tapped pipe 10, the corporation cock 29 will be threaded onto the upper end of the nipple as shown. To the upper end of the corporation cock will be secured by a threaded and packed joint, the tool-carrying cap 30 through which passes a plug-removing tool 31, a stuffing box 32 being provided in the neck of the cap 30, so as to give a fluid-tight joint between the tool 31 and the cap, and prevent pressure from the main, when the plug is removed, from passing out through the tool-carrying cap 30.

With the parts assembled as shown in Fig. 4, the key 33 of the corporation cock 29 will be opened so as to permit the threaded head 34 of the tool 31 to be passed downwardly through the corporation cock into engagement with the threaded bore 28 of the closure or plug 27, the said tool 31 being provided with a square or other suitably formed tool-receiving tip 35 at its upper end so as to rotate the tool 31 and engage the threaded end 34 with the plug 27, as shown in Fig. 4. When the tool and plug are engaged as shown, continued rotation of the tool will run the plug out of the nipple. When the plug is disengaged from the nipple, pressure, will, of course, enter the corporation cock, but because of the fluid-tight cap 30 it cannot escape. The tool 31 with its head 34, and the attached plug or closure 27, will be drawn upwardly above the key 33 of the corporation cock. That key 33 will then be turned to its closed position, as shown in Fig. 3, whereupon the cap, plug-removing tool, and plug may be removed from the corporation cock and the connection is complete.

It will be seen that by providing this assembly of parts, including the nipple and the corporation cock, a corporation cock of any size, within wide limits, can be successfully tapped onto a pipe, for the nipple determines the size of the tap hole, and the corporation cock, since it is not passed through the tapping machine proper, may be of a size greater than is now possible with the tapping machines and methods for inserting corporation cocks now in use.

Instead of the screw-threaded closure just described, we may provide those closures shown in Figs. 5, 6, 7 and 8, in which the nipple, instead of being threaded and provided with a removable plug, is formed with a break-out web interiorly thereof. In the form shown in Fig. 5, the web 35 is weakened circumferentially as at 36, so that after the nipple 25 has been inserted in the pipe and the corporation cock 29 has been secured to the nipple in the manner described, the cap 30, with a suitable breakout tool may be secured to the corporation cock and by a driving pressure or blows the web 35 broken out of the nipple.

In the form shown in Figs. 6 and 7, the web 37 will be scored circumferentially at 38 and also diametrically, as at 39, so that, in the breaking out, the web, instead of a single piece, will be broken out into a plurality of pieces.

In the construction shown in Fig. 8, the web 40 is shown at the lower end of the nipple with a circumferentially weakened-line 41.

It will be obvious that this weakened web may be placed at any point in the nipple where it may be found desirable.

In that form of the invention shown in Fig. 9, a slightly different form of closure is provided. The nipple, the corporation cock, and the tool-carrying cap are substantially the same as that just described, except that the tool-carrying cap 42 is of slightly different form, being shown as threaded into an interiorly threaded corporation cock, as distinguished from an exteriorly threaded cock, as shown in the other views. A stuffing box 43 is provided for the cap, as before, and a plug removing tool 44 having a hand wheel 45, by means of which it is turned, so that the tool 44 may be moved back and forth in the carrying cap 42. The plug or closure 46 will be constructed generally as heretofore described, except that it will be provided with an auxiliary relief valve 47, which is held normally closed by the spring 48, as shown in Fig. 9. The plug or closure 46 will have an internally threaded bore 49, as in the other construction, and the lower end of the tool 44 will be threaded, as at 50, to engage this internally threaded bore 49 of the plug. The head 50 of the plug-removing tool will, however, be provided with fluid passages 51, passing vertically therethrough from a cavity 52 in the bottom thereof, and connecting with a laterally disposed passage 53, delivering exteriorly of the wall of the head 50.

When the tool 44 is thrust downwardly and the head 50 brought into threaded engagement with the plug or closure 46, the central boss or projection on the head of the tool will engage the stem 54 of the valve 47, forcing said valve open against the pressure of its spring 48, so as to permit the pressure to pass inwardly into the corporation cock, and by means of the passages 51 and 53 fill the cock and the tool-carrying cap 42, the stuffing box 43 preventing any escape of the fluid about the tool 44. This will relieve and equalize pressure above and below the plug 46, so that when it is finally disengaged from the nipple there will not be any undue thrust against the plug-removing tool, as would be the case under extremely high pressure if no provision for pressure relief were made.

When the plug and tool have been withdrawn into the upper part of the corporation cock above the key 55, that key will be turned to the closed position heretofore described, and the cap 42 with the tool and the removed plug, can then be taken from the corporation cock and it is in readiness for service connection.

The form of device illustrated in Figs. 9 and 10 will be found useful where a very high pressure is being tapped, and under conditions where, without equalization of pressure, there might be danger of an outward thrust of the plug-removing tool, under the suddenly released pressure from the main, which it is desirable to avoid.

By utilizing the apparatus and following the steps of the method described, we are enabled to attach corporation cocks of any size, now in commercial use, to mains or pipes without the necessity of resorting to tapping machines of different sizes, for it is only necessary that a tapping machine of sufficient size to give the proper tap opening be provided, and thereafter a corporation cock of any size may be used. Furthermore, such tapping and attaching of the corporation cocks may be accomplished under the highest pressure without difficulty and without danger of injury to the machine and devices utilized and to the workmen engaged in the operation.

It is obvious that mechanical changes, and the adoption of different, though equivalent, expedients, may be made, departing from the illustrative example herein given of our invention, and it is equally obvious that such changes, since they involve merely the exercise of mechanical skill, would still be within the range of our invention, and we do not, therefore, limit ourselves to the exact details of construction shown, except in so far as we are limited by the terms of the appended claims.

We claim:—

1. The step preliminary to removing a temporary closure means from a cock-receiving nipple in communication at one end with a pressure main, consisting in equalizing the pressure at each side of the closure means.

2. The step preliminary to removing a temporary closure means from a cock-receiving nipple in communication at one end with pressure main, consisting in forming a by-pass from the pressure main to a closed chamber at the other end of said nipple.

3. In combination with a nipple in attachment at one end with a pressure main, a removable plug in said nipple, means forming a closed chamber at the other end of said nipple beyond the plug, and means for permitting a by-pass of fluid from the main to said chamber prior to removing the plug.

4. In combination with a nipple in attachment at one end with a pressure main, a removable plug in said nipple, means forming a closed chamber at the other end of said nipple beyond the plug, and means for permitting a by-pass of fluid from the main to said chamber through the plug prior to removing the plug.

5. In combination with a nipple for attachment to a pressure main, a removable plug in the nipple, and a valve carried by said plug.

6. In combination with a nipple for attachment to a pressure main, a removable plug in the nipple, a valve in said plug; and means for removing the plug adapted to open the valve for permitting the escape of the pressure fluid beyond the plug.

7. In combination with a nipple for attachment to a pressure main, a removable plug in the nipple, a valve in said plug; means for removing the plug adapted to open the valve for permitting the escape of the pressure fluid beyond the plug and a closed chamber for confining the escaped fluid.

8. In combination with a nipple in attachment at one end with a pressure main, a removable plug in said nipple, and means for permitting equalization of the pressure at each side of said plug preliminary to removing the plug.

9. In combination with a nipple in attachment at one end with a pressure main, a removable plug in said nipple, a valve in said plug, and a tool having a perforated head for engaging the plug to remove it and adapted also to open the valve for permitting the escape of the pressure fluid beyond the plug.

10. In combination with a nipple in attachment with one end with a pressure main, a removable plug in said nipple, a substantially centrally disposed valve in said plug, said plug having a threaded collar surrounding the valve, and a tool having a perforated threaded head for engaging said collar and adapted to open said valve for permitting the escape of the pressure fluid therethrough, and through the perforated head.

In testimony whereof, we, PHILIP MUELLER, and HELENA SCHUERMANN, executrix of the last will and testament of ANTON C. SCHUERMANN, deceased, have hereunto set our hands.

PHILIP MUELLER.
HELENA SCHUERMANN,
*Executrix of Anton C. Schuermann, Deceased.*